United States Patent
Kim et al.

(10) Patent No.: US 9,668,616 B2
(45) Date of Patent: Jun. 6, 2017

(54) AUTOMATIC FRYING MACHINE

(71) Applicant: KORNIC Automation Co., Ltd, Hwaseong-si (KR)

(72) Inventors: Kyeung-Tai Kim, Hwaseong-si (KR); Hyun-Tae Kim, Osan-si (KR)

(73) Assignee: KORNIC AUTOMATION CO., LTD., Hwaseong-si (KR)

( * ) Notice: Subject to any disclaimer, the term of this patent is extended or adjusted under 35 U.S.C. 154(b) by 0 days.

(21) Appl. No.: 14/748,404

(22) Filed: Jun. 24, 2015

(65) Prior Publication Data
US 2016/0278577 A1    Sep. 29, 2016

(30) Foreign Application Priority Data

Mar. 23, 2015   (KR) .................. 10-2015-0039921

(51) Int. Cl.
*A47J 37/12*    (2006.01)

(52) U.S. Cl.
CPC ....... *A47J 37/1219* (2013.01); *A47J 37/1228* (2013.01)

(58) Field of Classification Search
CPC ....... A47J 37/12–37/1295; A23L 1/01–1/0142
USPC .......... 99/324–333, 339, 348, 494, 360–367, 99/403–404; 218/388, 389; 118/16, 18, 118/24, 26, 29, 30
See application file for complete search history.

(56) References Cited

U.S. PATENT DOCUMENTS

| | | | | |
|---|---|---|---|---|
| 3,738,313 A * | 6/1973 | Heim | ...................... | A23P 1/082 118/16 |
| 4,191,881 A * | 3/1980 | Ahlgren | ................ | A47J 37/046 219/388 |
| 4,440,071 A * | 4/1984 | Boosalis | ............... | A47J 37/045 221/150 A |
| 4,508,025 A * | 4/1985 | Schultz | ..................... | A21B 1/44 198/406 |
| 5,205,206 A * | 4/1993 | Kitama | .................. | A21C 11/16 99/326 |
| 5,855,164 A * | 1/1999 | Chiang | .................. | A21B 7/005 366/146 |
| 7,886,657 B2 * | 2/2011 | Nothum, Jr. | ............. | A21C 9/04 99/352 |

(Continued)

FOREIGN PATENT DOCUMENTS

JP    01164337 A2    6/1989
KR   100963819 B1    6/2010

*Primary Examiner* — Michael Laflame, Jr.
(74) *Attorney, Agent, or Firm* — NSIP Law

(57) ABSTRACT

The present invention relates to an automatic frying machine comprising: a frying process part having divided spaces, wherein a plurality of module-type process units which carry out each of predetermined frying processes are detachably disposed in the divided spaces; and a transfer part which is in communication with the plurality of process units of the frying process part and which carries a basket having frying materials in and out of the plurality of process units and moves the basket, wherein the transfer part comprises: a basket which carries the frying material in and out through an opening formed on the plurality of process units; a transfer unit which raises and lowers the basket and slides it back and forth; and a horizontal moving part which moves the transfer unit horizontally.

6 Claims, 8 Drawing Sheets

(56) References Cited

U.S. PATENT DOCUMENTS

| | | | | |
|---|---|---|---|---|
| 8,646,383 B1* | 2/2014 | Howard | ............... | A23L 1/0128 |
| | | | | 126/19 R |
| 2006/0032382 A1* | 2/2006 | Nothum | ................. | A21C 9/04 |
| | | | | 99/357 |

* cited by examiner

AUTOMATIC FRYING MACHINE

CROSS REFERENCE TO RELATED APPLICATIONS

This application claims priority to Korean Patent Application No. 10-2015-0039921, filed on Mar. 23, 2015, and the entire disclosures of these applications are incorporated herein by reference for all purposes.

TECHNICAL FIELD

The present invention relates to an automatic frying machine, and in particular to an automatic frying machine which cooks fried food such as a fried chicken or a fried potato and which performs automatically cooking process from the insertion of material to the completion of cooking by the actuation of one button.

BACKGROUND ART

In general, fried food is popular because it is crispy and has aromatic flavor unique to fat. For example, there are oil fried chicken oil, seasoned fried chicken which is made by applying seasoning sauce to fried chicken, fried potato, etc.

Conventionally, for the cooking process, materials are mixed manually and batter is spread on the materials. After that materials are put into the oil container and then fired. This lowers productivity, raises labor charge due to the increase of the number of workers and increases the product cost, thereby decreasing the added value of the product.

To solve the problems, Korean patent No. 963819 suggests an automatic frying machine. As shown in FIG. 1, this machine comprises: a frying container having a heater inside and an inlet opening on the upper front; a lift which lowers frying materials to the frying container to put them into oil or raises them; an upper plate which blocks the upper of the frying container and has an exhaust path to exhaust gas; a filter room; a case which provides an air flow path from an air inlet to an air outlet at the rear upper part through the front and upper parts of the frying container and the first and second filter rooms; an oil filter; an air filter; a exhaust fan; and a controller, wherein oil and odor generated by frying process are filtered twice during the exhaust to remove odor from the exhaust gas.

However, a plurality of cooking process such as cleaning, curing (salting), breading, frying, etc. are required for cooking fried chicken. The prior art has only frying and exhausting functions. Cleaning, curing, breading, etc. are still needed to be processed manually and thus the whole cooking process is not carried out automatically.

Further, in the frying machine of the prior art, once one frying material is inserted into the frying machine, another frying material must be waited until the cooking of the frying material is finished. This has a low productivity since it takes time to finish frying.

Also, in the frying machine of the prior art, an input of a plurality of materials into one frying machine simultaneously to increase the efficiency of cooking causes the materials to be stuck together, thereby resulting a poor quality of the fried food having un-fried parts and over-fried parts.

Technical Problems to be Solved

The object of the present invention is to solve the above problems by providing an automatic frying machine which cooks fried food such as a fried chicken or a fried potato and which performs automatically cooking process from the insertion of material to the completion of cooking by the actuation of one button.

Another object of the present invention is to provide an automatic frying machine which cooks a plurality of frying materials in one frying machine and controls the cooking processes not to be overlapped.

The present invention has yet another object which is to provide an automatic frying machine in which functional units for frying process to fry chicken, etc. are disposed to minimize the influence by heat and efficient cooking is possible by using one common transfer unit and by minimizing affects between the functional units.

Technical Solution

To attain the above objects, an automatic frying machine according to the present invention comprises: a frying process part having divided spaces, wherein a plurality of module-type process units which carry out each of predetermined frying processes are detachably disposed in the divided spaces; and a transfer part which is in communication with the plurality of process units of the frying process part and which carries a basket having frying materials in and out of the plurality of process units and moves the basket.

The plurality of process units comprises: an input unit into which frying material is inserted; an output unit which ejects fried material; a dry-powder breading unit which breads powder on the frying material; a wet-paste breading unit which breads wet-paste on the frying material breaded with powder; and a frying unit which fries the frying material breaded with powder and wet-paste by heating frying oil.

The plurality of process units comprise: a refrigeration unit in which the frying material is kept refrigerated; and a tumbling unit which carries out curing and stirs the frying material.

The frying process part is arranged on the front part of the automatic frying machine and the transfer part is arranged on the rear part of the automatic frying machine, and the refrigeration unit and the tumbling unit are arranged above the input unit, the output unit, the dry-powder breading unit, the wet-paste breading unit and the frying unit and extend the top of the transfer part.

The transfer part comprises: a basket which carries the frying material in and out through an opening formed on the plurality of process units; a transfer unit which raises and lowers the basket and slides it back and forth; and a horizontal moving part which moves the transfer unit horizontally.

The horizontal moving part comprises: a guide rail with which the transfer unit is engaged and which supports the transfer unit and is arranged along the length of the automatic frying machine; and a driving chain which is engaged with the transfer unit to slide the transfer unit to the left and the right; and a driving motor which drives the driving chain.

The transfer unit comprises: an elevation driving motor; an elevation shaft which is connected with the elevation driving motor; a transfer plate which is engaged with the elevation shaft and which moves upward and downward along the elevation shaft by the drive of the elevation driving motor; a forward-backward guide rail which is installed on the transfer plate; and a connection plate which moves back and forth along the forward-backward guide rail and which is connected with the basket.

The transfer unit comprises: a bottom plate which is engaged with the driving chain and the guide rail; an upper plate; and a supporting bar which is engaged with and supports the upper plate.

The transfer part comprises: a plurality of robot hands which carry the basket having the frying material in and out through opening formed on the plurality of process units; a horizontal moving unit which slides the robot hands to the left and the right; and a elevation moving unit which moves the horizontal moving unit upwards and downwards.

The horizontal moving unit and the elevation moving unit are configured as a screw bar having threads on the outer surface or are configured as a continuous variable chain such that they move upwards and downwards or slide by the rotation.

Effects

According to the automatic frying machine of the present invention, the frying machine can cook fried food such as a fried chicken or a fried potato and perform automatically cooking process from the insertion of material to the completion of cooking by the actuation of one button.

Also, the frying machine can cook a plurality of frying materials in one frying machine and control the cooking processes not to be overlapped.

Further, functional units for frying process to fry chicken, etc. can be disposed to minimize the influence by heat and efficient cooking is possible by using one common transfer unit and by minimizing affects between the functional units.

DETAILED DESCRIPTION

Figure 1:
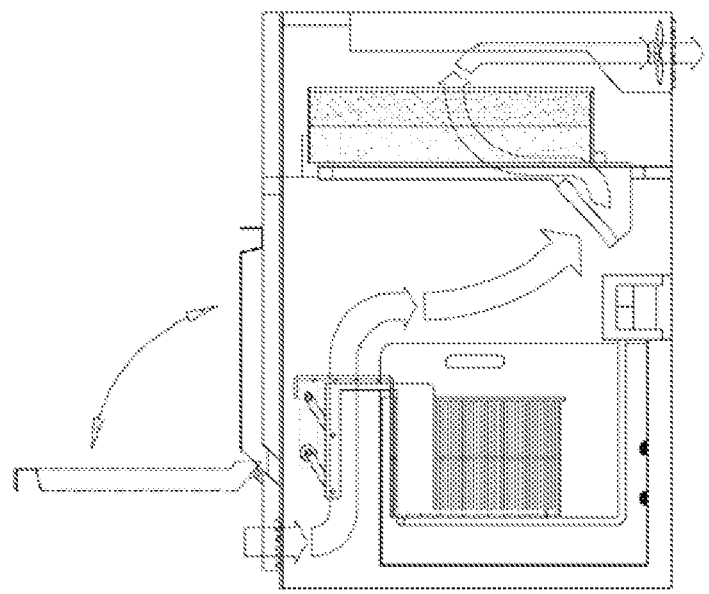
FIG. 1 shows a frying machine of the prior arts.
Figure 2:
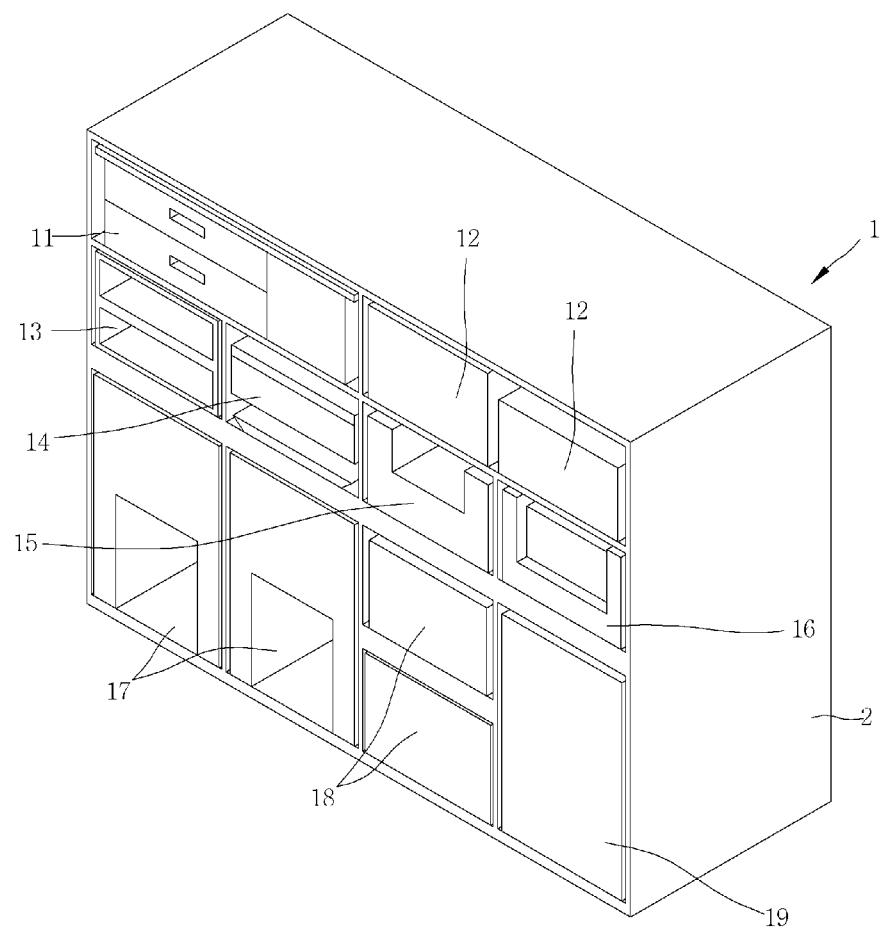
FIG. 2 is a perspective view representing an automatic frying machine according to the present invention.
Figure 3:
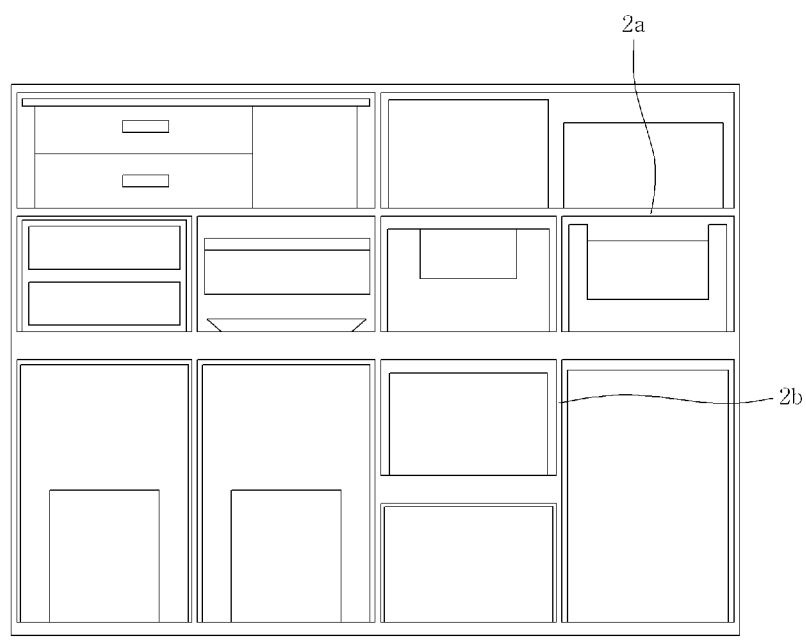
FIG. 3 is a front view of FIG. 2.
Figure 4:
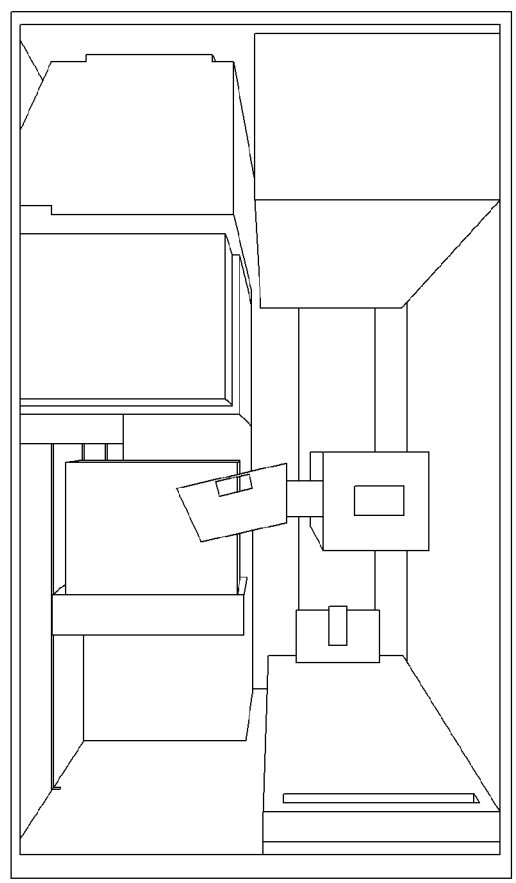
FIG. 4 is a cross-sectional side view of FIG. 2.

Hereinafter, embodiments of an automatic frying machine according to the present invention will be described in detail referring to the attached drawings.

An automatic frying machine according to the present invention relates to a frying machine for business use which is used at fried food restaurants such as a chicken restaurant, a franchise store, etc. However, the frying machine is not limited to the frying machine for business.

First Embodiment

FIGS. 2 to 6 represent the automatic frying machine according to the first embodiment according to the present invention. As shown in FIGS. 2 to 6, the automatic frying machine 1 comprises a frying process part 10 which performs frying process and a transfer part 20 which transfers frying materials.

The frying process 10 is arranged on the front part of the automatic frying machine 1 and it has a plurality of module-type process units which perform predetermined frying processes, respectively.

The automatic frying machine 1 has a body frame 2 which is provided with horizontal partitions 2a and vertical partitions 2b, respectively. The plurality of process units 11 to 19 are detachably arranged in spaces which are separated from each other by means of the horizontal partitions 2a and the vertical partitions 2b.

Further, a front-rear partition 2c is provided between the transfer part and each space divided by the horizontal partitions 2a and the vertical partitions 2b. The body frame of the frying machine is open at the front and the back and is divided vertically and horizontally such that each process unit is detachably arranged in each divided space. Also, the transfer part is protected against heat and oil generated from each process unit. The front-rear partition 2c has an opening which can be opened and closed such that the basket of the transfer part can be moved in and out.

Here, a door in the form of a chamber is installed on the front-rear partition 2c of the body frame of the frying machine at the position where the frying unit 17 is installed, thereby minimizing a heat loss of the frying machine.

The plurality of process units comprises an input unit 13, an output unit 14, a dry-powder breading unit 19, a wet-paste breading unit 18 and a frying unit 17.

Frying material such as a raw chicken is inserted into the input unit 13. When the frying material is inserted into the input unit 13, the basket of the transfer part is configured to have been carried in the input unit in advance such that the frying material can be received in the basket.

The output unit 14 is configured to take fried material out.

The dry-powder breading unit 19 has a jetting nozzle which jets dry-powder into the breading unit such that powder can be breaded on the frying material.

The wet-paste breading unit 18 contains wet-paste and is configured to bread wet-paste on the frying material by immersing the frying material breaded with powder into the wet-paste.

The frying unit 17 fries frying material which is breaded with the wet-paste and the powder by heating frying oil. In one embodiment, the frying unit 17 consists of two frying units considering a frying process which requires a long time. However, the number of process units is not limited to two.

In one embodiment, reference number 15 indicates a wet-paste mixing unit and reference number 16 indicates a mixing unit for a seasoned-chicken. However, the embodiment is not limited to the above and a control panel may be arranged in a space indicated by reference number 16.

Meanwhile, as shown in FIGS. 2 to 5, the plurality of process unit may further comprise a refrigeration unit 11 and a tumbling unit 12.

The refrigeration unit 11 keeps the frying material refrigerated and the tumbling unit 12 cures the frying material with curing agent and stirs it.

Figure 5:
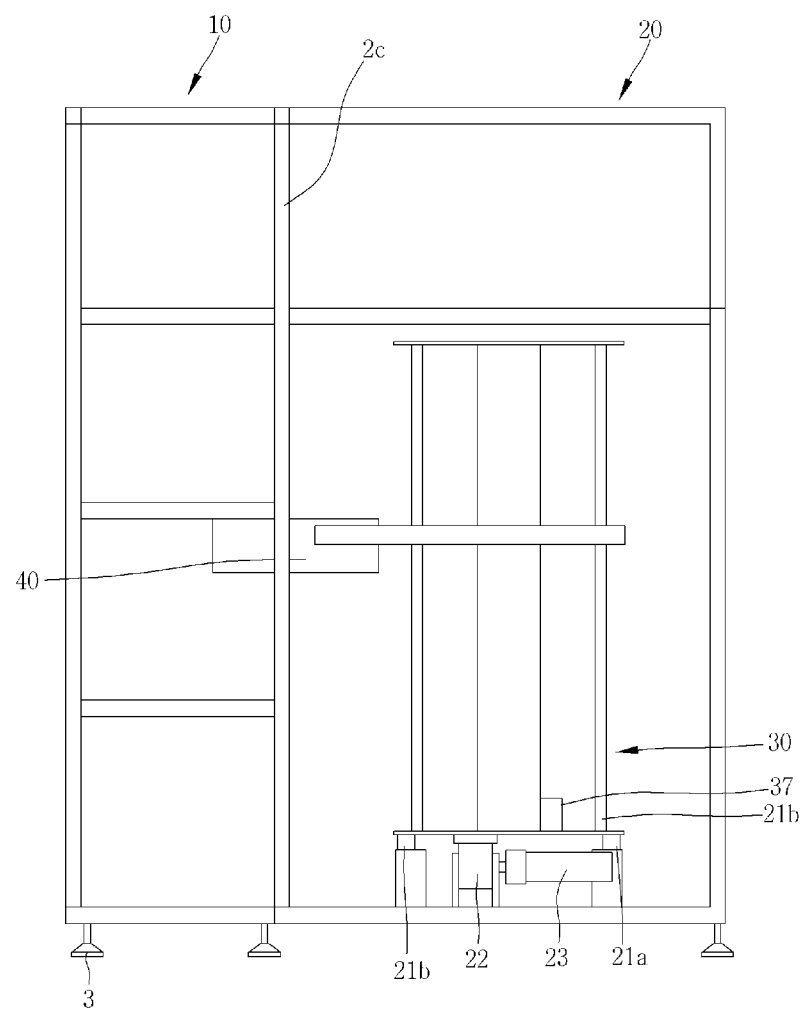
FIG. 5 is a cross-sectional side view of an automatic frying machine representing a transfer part according to one embodiment of the present invention.
Figure 6:
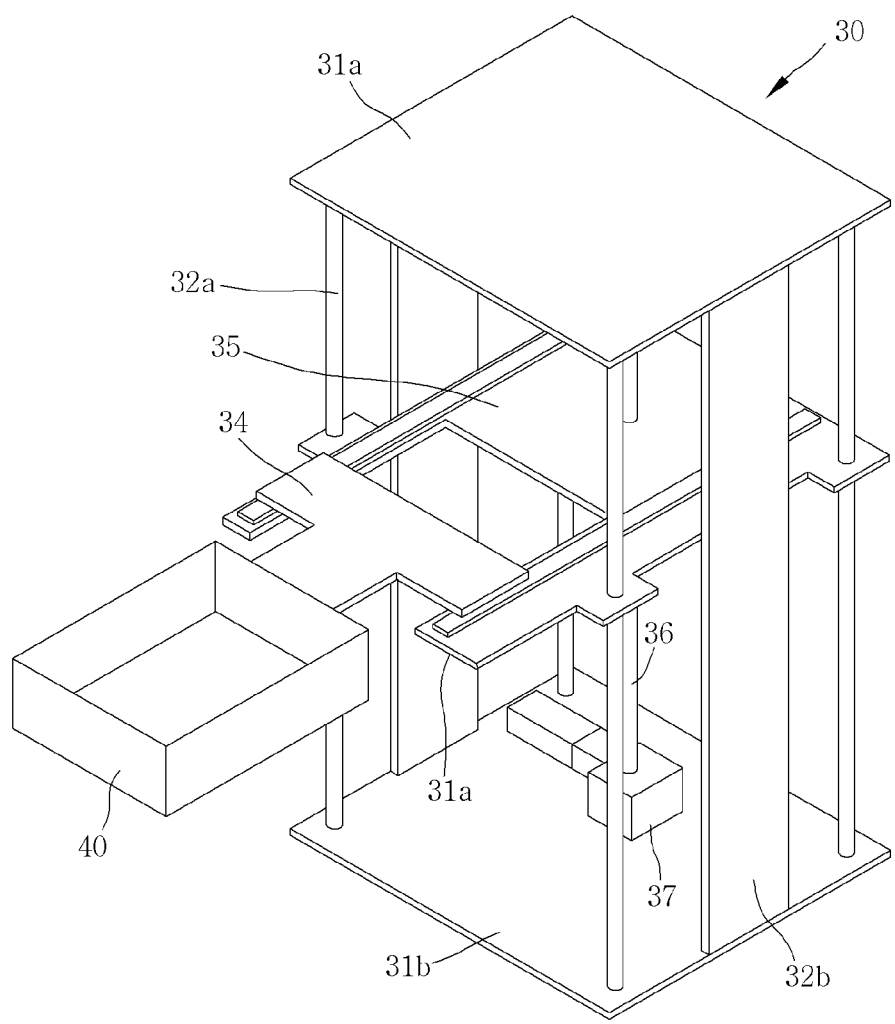
FIG. 6 is a transfer unit according to one embodiment of the present invention.

The refrigeration unit 11 and the tumbling unit 12 are arranged above the input unit, the output unit, the dry-powder breading unit, the wet-paste breading unit and the frying unit. As shown in FIG. 5, the refrigeration unit 11 and the tumbling unit 12 may also extend to the upper part of the transfer part.

The automatic frying machine according to the present invention has a transfer part 20 at the rear part of the frying process unit 10.

The transfer part 20 is a space which performs a movement function in common with regard to the plurality of process units and is provided with a transfer unit 30 and a basket 40.

The basket 40 moves in and out of the plurality of process units of the frying process part through the opening formed on the plurality of process units. Also, the basket 40 receives the frying materials during the process and transfers the frying material in and out when each process is finished at each process unit.

The basket 40 slides back and forth and moves up and down by the transfer unit 30.

The transfer unit 30 has an upper plate 31a, a bottom plate 31b and a supporting bar 32a, 32b which supports the upper plate and the bottom plate. The bottom plate 31b is engaged with a guide rail and a driving chain of a horizontal moving part which will be described below.

An elevation driving motor 37 is installed on the upper surface of the bottom plate 31b. An elevation shaft 36 is engaged with the elevation driving motor 37 and a transfer plate 35 is engaged with the elevation shaft 36.

The transfer plate 35 moves up and down along the elevation shaft by the drive of the elevation driving motor.

A forward-backward guide rail 33 is disposed on both sides of the transfer plate 35. A connecting plate 34 is engaged with the forward-backward guide rail 33. The connecting plate is connected to a LM guide or a screw bar to slide forward and backward along the forward-backward guide rail. The basket 40 is detachably engaged with the end of the connecting plate 34.

The transfer unit 30 moves along the horizontal moving part.

The horizontal moving part comprises a guide rail 21a, 21b, a driving chain 22 and a driving motor 23.

The bottom plate 31b of the transfer unit is engaged with the guide rails 21a, 21b and is supported by the guide rails. The bottom plate is installed along the length of the automatic frying machine.

The bottom plate 31b of the transfer unit is engaged with the driving chain 22 and the driving chain is driven by the driving motor 23 and rotates in the form of continuous variable belt.

In the present embodiment, one transfer unit 30 is installed on the horizontal moving part. However, a plurality of transfer units can be installed and be controlled not to interrupt each movement of the plurality of transfer units.

Hereinafter, the operation of automatic frying machine according to the present invention will be explained.

First, frying material is transferred from the refrigeration unit 11 or from the outside and is inserted in the basket 40 which is already provided on the input unit 13.

Then, the basket moves backward by the movement of the transfer unit 30 and then moves toward the dry-powder breading unit by the sliding movement to the left and the right.

Then, the basket slides forward and dry-powder is breaded onto the frying material in the dry-powder breading unit.

Then, the frying material is taken out and moves to the wet-paste breading unit. After that, a wet-paste breading is performed and then a second dry-powder breading is performed.

Then, the frying material is inserted in the frying unit and is fried. After a predetermined time, fried material is taken out and is taken to the outside by the output unit.

At this time, by means of a plurality of transfer units, the next frying material is inserted to perform a breading process while the prior frying material is in the frying process.

Therefore, it is possible to cook food such as fried chicken or fried potato and to perform every process from the insertion of material to the completion of cooking by only the actuation of one button. With the use of a plurality of the transfer units and the control of them, a plurality of frying material can be cooked simultaneously in one automatic frying machine and the cooking processes are not overlapped.

Functional units for frying process to fry chicken, etc. are disposed to minimize the influence by heat. Efficient cooking is possible by using one transfer unit and by minimizing affects between the functional units.

Second Embodiment

Figure 7:
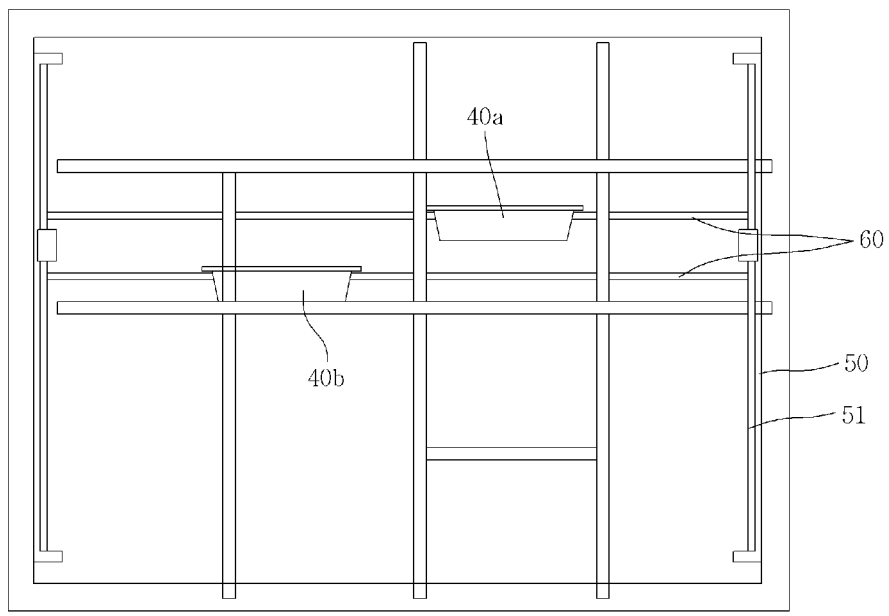
FIG. 7 is a transfer unit according to another embodiment of the present invention.
Figure 8:
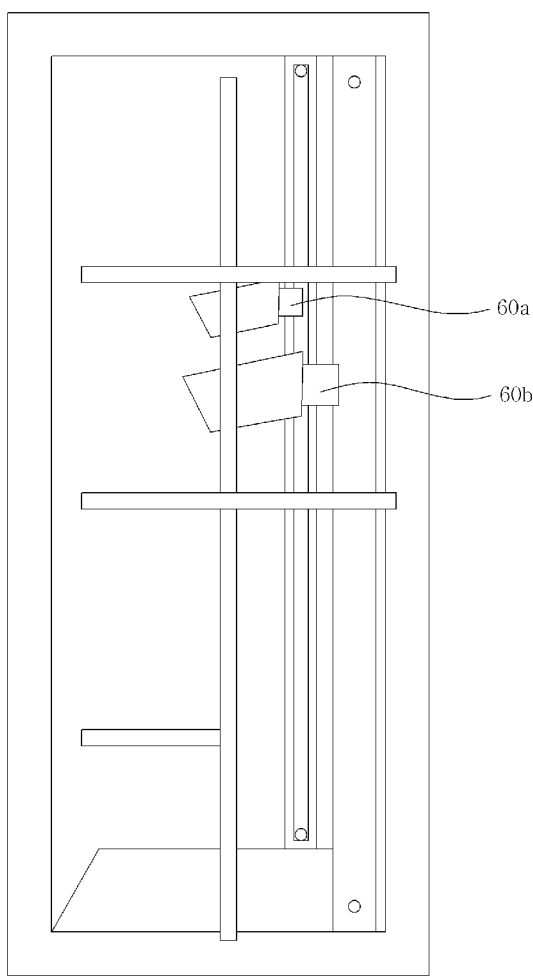
FIG. 8 is a cross-sectional side view of FIG. 7.

FIGS. 7 and 8 represent the second embodiment of the present invention. This embodiment is the same as the first embodiment except the transfer unit. The same reference numerals are used to indicate the same elements and the repeated explanations will be omitted.

As shown in FIGS. 7 and 8, the transfer unit according to this embodiment comprises a plurality of baskets 40a, 40b, a plurality of horizontal moving units 60 and an elevation unit 51.

The plurality of basket 40a, 40b are engaged with each horizontal moving unit 60 by a robot hand 60a, 60b to move forward and backward and to take frying material in and out through an opening formed on the plurality of process units.

The horizontal moving unit 60 is configured such that a plurality of horizontal moving units are engaged with the elevation moving units 51 to move upward and downward.

The horizontal moving unit 60 is configured as a screw bar having threads on the outer surface such that the basket 40a, 40b and the robot hand 60a, 60b are slid to the right or the left by the rotation of the screw bar. Alternatively, the horizontal moving unit is configured as a continuous variable chain such that the basket 40a, 40b and the robot hand 60a, 60b are slid to the right or the left by the rotation of the continuous variable chain.

The elevation moving unit 51 is engaged with a frame 50 provided on the body frame 2 of the automatic frying machine. Similarly to the horizontal moving unit, the elevation moving unit 51 is configured as a screw bar having threads on the outer surface or as a continuous variable chain so that it raises and lowers the horizontal moving unit 60 engaged with the elevation moving unit 51 by the rotation.

Therefore, with the preparation of a plurality of horizontal units and baskets and the control of them, a plurality of frying material can be cooked simultaneously in one automatic frying machine and the cooking processes are not overlapped.

It will be appreciated that although some embodiments are illustrated and described, various modifications or variations can be made without departing from the scope and spirit of the invention. The scope of the present invention may be determined by the accompanying claims and may comprise their equivalents.

LIST OF REFERENCE NUMERALS

1: automatic frying machine
2: body frame
10: frying process part

20: transfer part
30: transfer unit
40: basket

The invention claimed is:

1. An automatic frying machine comprising:
a frying process part comprising divided spaces, wherein a plurality of module-type process units, each of which is configured to execute a predetermined frying process, are detachably disposed in the divided spaces; and
a transfer part configured to be in communication with the plurality of module-type process units of the frying process part, and configured to move a basket in and out of the plurality of process units, wherein the transfer part comprises:
 a basket configured to carry frying material in and out of the plurality of process units, through an opening formed in the plurality of process units;
 a transfer unit configured to raise and lower the basket, and to slide it back and forth, wherein the transfer unit comprises:
  an elevation driving motor,
  an elevation shaft connected with the elevation driving motor,
  a transfer plate configured to engage with the elevation shaft, and configured to move upward and downward along the elevation shaft, in response to a drive of the elevation driving motor,
  a forward-backward guide rail installed on the transfer plate, and
  a connection plate connected with the basket, and configured to move back and forth along the forward-backward guide rail; and
 a horizontal moving part configured to move the transfer unit horizontally.

2. The frying machine according to claim 1, wherein the plurality of process units comprises:
an input unit into which frying material is inserted;
an output unit configured to eject fried material;
a dry-powder breading unit configured to bread powder on the frying material;
a wet-paste breading unit configured to bread wet-paste on the frying material breaded with powder; and
a frying unit configured to fry the frying material breaded with powder and wet-paste, by heating frying oil.

3. The frying machine according to claim 2, wherein the plurality of process units comprises:
a refrigeration unit configured to refrigerate the frying material; and
a tumbling unit configured to cure and stir the frying material.

4. The frying machine according to claim 3,
wherein the frying process part is arranged on the front part of the automatic frying machine, and the transfer part is arranged on the rear part of the automatic frying machine, and
wherein the refrigeration unit and the tumbling unit are arranged above the input unit, the output unit, the dry-powder breading unit, the wet-paste breading unit, and the frying unit, and extend a top of the transfer part.

5. The frying machine according to claim 1, wherein the horizontal moving part comprises:
a guide rail with which the transfer unit is engaged, and configured to support the transfer unit, and is arranged along the length of the automatic frying machine; and
a driving chain which is engaged with the transfer unit, and configured to slide the transfer unit to the left and the right; and
a driving motor configured to drive the driving chain.

6. The frying machine according to claim 1, wherein the transfer unit comprises:
a bottom plate engaged with the driving chain and the guide rail;
an upper plate; and
a supporting bar engaged with the upper plate, and configured to support the upper plate.

* * * * *